US012603268B2

(12) United States Patent
Uchiyama et al.

(10) Patent No.: US 12,603,268 B2
(45) Date of Patent: Apr. 14, 2026

(54) TIME-OF-FLIGHT MASS SPECTROMETER AND TUNING METHOD FOR THE SAME

(71) Applicant: SHIMADZU CORPORATION, Kyoto (JP)

(72) Inventors: Kosuke Uchiyama, Kyoto (JP); Tomoyuki Oshiro, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 396 days.

(21) Appl. No.: 18/295,900

(22) Filed: Apr. 5, 2023

(65) Prior Publication Data

US 2023/0386817 A1 Nov. 30, 2023

(30) Foreign Application Priority Data

May 30, 2022 (JP) ................................ 2022-087521

(51) Int. Cl.
*H01J 49/40* (2006.01)

(52) U.S. Cl.
CPC .................................. *H01J 49/401* (2013.01)

(58) Field of Classification Search
CPC ........ H01J 49/401; H01J 49/40; H01J 49/025; H01J 49/0031; H01J 49/022
See application file for complete search history.

(56) References Cited

U.S. PATENT DOCUMENTS

2008/0272289 A1* 11/2008 Vestal .................. H01J 49/164 250/287
2008/0272291 A1* 11/2008 Vestal ..................... H01J 49/40 250/288
2012/0138788 A1* 6/2012 Taniguchi ............ H01J 49/424 250/287

(Continued)

FOREIGN PATENT DOCUMENTS

EP 1124624 B1 * 3/2010 ............ H01J 49/061
JP 2018-120804 A 8/2018
WO 2019/229950 A1 12/2019

OTHER PUBLICATIONS

Japanese Office Action dated Nov. 18, 2025, issued in Japanese application No. 2022-087521.

*Primary Examiner* — Wyatt A Stoffa
*Assistant Examiner* — Christopher J Gassen
(74) *Attorney, Agent, or Firm* — Sughrue Mion, PLLC

(57) ABSTRACT

In a TOFMS measurement unit, an ion acceleration section accelerates ions to send them into a flight space, within which a flight-field creation section creates, an electric field for causing ions to fly. A controller unit operates the measurement unit so as to repeat a measurement for a predetermined sample while varying a voltage applied to an electrode in the measurement unit, and calculates mass-resolving power based on each measurement result. An approximate function calculator unit finds an approximate function representing a relationship between the voltage and the mass-resolving power, based on data of combinations of (Continued)

the voltage and the mass-resolving power obtained under the control of the controller unit. A voltage determiner unit determines a voltage value corresponding to a target value of the mass-resolving power by the approximate function, and determines the voltage value as a voltage to be applied to the electrode in the TOFMS concerned.

11 Claims, 4 Drawing Sheets

(56) References Cited

U.S. PATENT DOCUMENTS

| | | | | |
|---|---|---|---|---|
| 2013/0099111 | A1* | 4/2013 | Giles ..................... | H01J 49/401<br>250/282 |
| 2013/0313427 | A1* | 11/2013 | Mizutani ............. | H01J 49/4215<br>250/290 |
| 2014/0299762 | A1* | 10/2014 | Mukaibatake ...... | H01J 49/0036<br>250/281 |
| 2016/0111271 | A1* | 4/2016 | Böhm ................... | H01J 49/164<br>250/282 |
| 2021/0210316 | A1 | 7/2021 | Oshiro | |
| 2023/0089568 | A1* | 3/2023 | Marriott ................ | H01J 49/004<br>250/287 |

* cited by examiner

TIME-OF-FLIGHT MASS SPECTROMETER AND TUNING METHOD FOR THE SAME

TECHNICAL FIELD

The present invention relates to a time-of-flight mass spectrometer (TOFMS) and a tuning method for a TOFMS.

BACKGROUND ART

In recent years, mass spectrometers have been frequently used for the identification and quantitative determination of compounds contained in samples. In a TOFMS, which is one type of mass spectrometer, a specific amount of kinetic energy is imparted to ions originating from a sample. The ions are thereby accelerated and introduced into a flight space, and the time of flight of each ion which has flown a predetermined distance within the flight space is measured. Since this time of flight depends on the mass-to-charge ratio (m/z) of the ion, a mass spectrum showing the relationship between m/z value and ion intensity (amount of ions) can be created by converting the time of flight of each ion into an m/z value.

In general, TOFMSs are often used in the case where a high level of mass-resolving power or mass accuracy is required, as in the case of estimating the structure of an unknown compound from the result of a precise mass measurement. Therefore, not only an improvement in sensitivity but also a further improvement in mass-resolving power and mass accuracy have been required for TOFMSs.

Mass spectrometers are normally equipped with an auto-tuning function for automatically adjusting the voltages applied to the electrodes in specific sections which affect the behavior of the ions within the device (see Patent Literature 1 or other related documents). In normal cases, this auto-tuning is performed by tuning the related parameter values, such as a voltage given to each related section, so as to maximize the top intensity of a mass peak corresponding to a specific compound obtained in a measurement of a standard sample. Since the top intensity of the mass peak is basically related to the mass-resolving power, maximizing the top intensity of the mass peak can also nearly maximize the mass-resolving power.

In an orthogonal acceleration TOFMS, which is one type of TOFMS, as disclosed in Patent Literature 2, the electrodes which can affect the behavior of ions as well as influence the detection sensitivity, mass-resolving power and other performance values of the device include: a first acceleration electrode located within an orthogonal accelerator; a second acceleration electrode configured to further accelerate the ions ejected from the orthogonal accelerator; a flight tube having an internal flight space; and a reflectron configured to create an electric field for reflecting ions within the flight space. The voltages applied to those electrodes are possible targets of the auto-tuning.

CITATION LIST

Patent Literature

Patent Literature 1: JP 2018-120804 A
Patent Literature 2: WO 2019/229950 A

SUMMARY OF INVENTION

Technical Problem

By performing the auto-tuning, the conventional TOFMS can be tuned to create a condition under which the device can almost fully exhibit its best performance. However, the conventional auto-tuning system has the following problem.

In many cases, there is a difference in performance among individual devices even when those devices are in a practically unused condition, i.e., even when the electrodes and other related elements are barely contaminated due to the use of the devices. Therefore, when a measurement of the same sample is performed with a plurality of devices which are of the same model and have been individually tuned by auto-tuning, the measurement result may possibly vary from device to device. Additionally, although the difference among individual devices may be insignificant when the devices are fresh (or when the devices have just been overhauled), the difference among individual devices may possibly increase with the use of those devices. Even when each measurement result satisfies the requirement of the target mass-resolving power described in the specifications of the device, the measurement results obtained for the same sample with a plurality of devices cannot be simply compared with each other if there is a considerable difference among those measurement results. Therefore, the difference in performance among individual devices may possibly lead to a claim on the product from users to the manufacturer, which may undermine users' confidence in the product itself.

The present invention has been developed to solve this problem. Its primary objective is to provide a TOFMS and its tuning method which can reduce the variation in mass-resolving power among a plurality of devices which are of the same model, i.e., which are identical in configuration and structure.

Solution to Problem

One mode of the TOFMS according to the present invention developed for solving the previously described problem is a time-of-flight mass spectrometer having a measurement unit which includes a flight-field creation section configured to create, within a flight space, an electric field for causing ions to fly, and an ion acceleration section configured to accelerate ions which are a measurement target and to send the ions into the flight space, the time-of-flight mass spectrometer including:

- a controller unit configured to operate the measurement unit so as to repeatedly perform a measurement for a predetermined sample while varying a voltage applied to an electrode included in the measurement unit, and to calculate mass-resolving power based on a measurement result in each measurement;
- an approximate function calculator unit configured to find an approximate function which approximates a relationship between the voltage applied to the electrode and the mass-resolving power corresponding to the voltage, based on data of a plurality of combinations of the voltage and the mass-resolving power obtained under the control of the controller unit; and
- a voltage determiner unit configured to determine a voltage value corresponding to a target value of the mass-resolving power by using the approximate function, and to determine the voltage value as a voltage to be applied to the electrode in the time-of-flight mass spectrometer concerned.

One mode of the tuning method for a TOFMS according to the present invention developed for solving the previously described problem is a method for tuning a plurality of time-of-flight mass spectrometers each of which has a measurement unit which includes a flight-field creation section configured to create, within a flight space, an electric field for causing ions to fly, and an ion acceleration section configured to accelerate ions which are a measurement target and to send the ions into the flight space, the tuning method including:

a target setting step for setting a target value of the mass-resolving power common to the plurality of time-of-flight mass spectrometers; and a measurement step and a voltage determination step which are performed in each of the plurality of time-of-flight mass spectrometers, where:

the measurement step includes repeatedly performing a measurement for a predetermined sample while varying a voltage applied to an electrode included in the measurement unit, and calculating the mass-resolving power based on a measurement result in each measurement; and the voltage determination step includes determining a voltage value corresponding to the target value based on data of a plurality of combinations of the voltage applied to the electrode and the mass-resolving power corresponding to the voltage, obtained in the measurement step, and determining the voltage value as the voltage to be applied to the electrode in the time-of-flight mass spectrometer concerned.

Advantageous Effects of Invention

By the previously described modes of the TOFMS and its tuning method according to the present invention, the mass-resolving power can be roughly equalized among a plurality of devices of the same model, so that the difference in mass-resolving power among the devices can be decreased. Therefore, the variation of the measurement results obtained by performing a measurement for the same sample with a plurality of devices can be reduced.

DESCRIPTION OF EMBODIMENTS

A quadrupole time-of-flight mass spectrometer (which may be hereinafter called the "Q-TOFMS") as one embodiment of the TOFMS according to the present invention is hereinafter described with reference to the attached drawings.

The present Q-TOFMS is a tandem type of mass spectrometer in which a quadrupole mass filter is combined with an orthogonal acceleration TOFMS. It is capable of selectively carrying out either a normal mass spectrometric analysis which includes no dissociation of ions or an MS/MS analysis which includes the dissociation of a specific ion.

Figure 1:
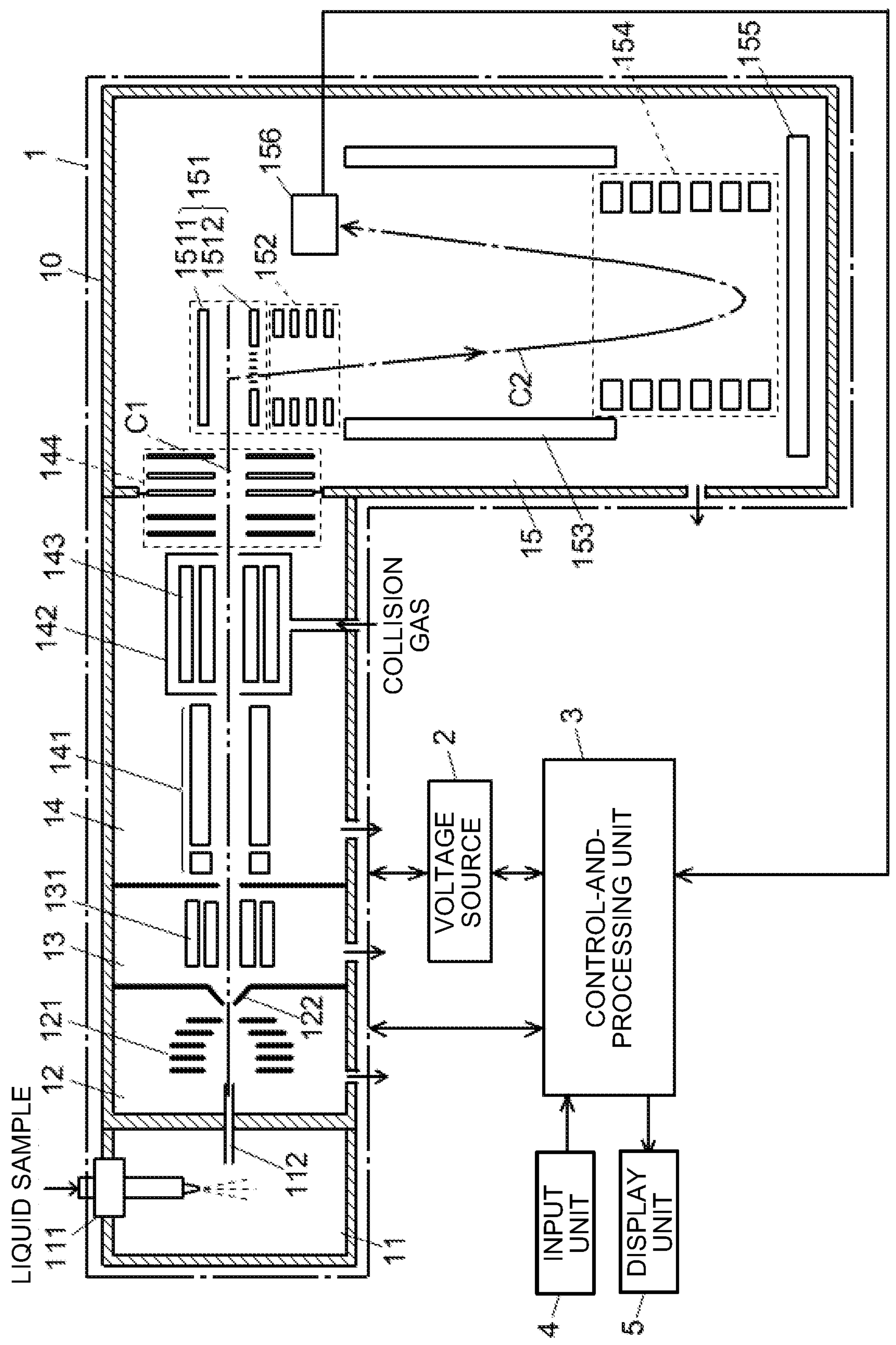
FIG. 1 is a configuration diagram of the main components of a quadrupole time-of-flight mass spectrometer as one embodiment of the present invention.
Figure 2:
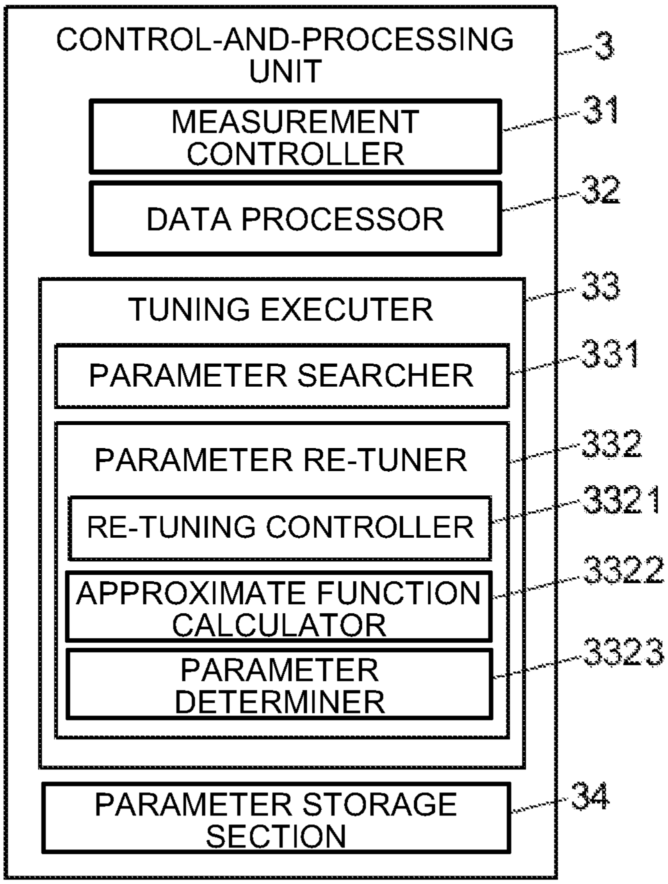
FIG. 2 is a functional block configuration diagram of a control-and-processing unit in the quadrupole time-of-flight mass spectrometer according to the present embodiment.

FIG. 1 is a configuration diagram of the main components of the Q-TOFMS according to the present embodiment. FIG. 2 is a functional block configuration diagram of a control-and-processing unit in the Q-TOFMS according to the present embodiment.

As shown in FIG. 1, this Q-TOFMS includes a measurement unit 1, voltage source 2, control-and-processing unit 3, input unit 4 and display unit 5.

The measurement unit 1 is a unit for performing a measurement for a sample (liquid sample). This unit includes a vacuum chamber 10 and an ionization chamber 11 connected to the front end of the vacuum chamber 10. The inner space of the vacuum chamber 10 is roughly divided into four chambers: the first intermediate vacuum chamber 12, second intermediate vacuum chamber 13, first analysis chamber 14 and second analysis chamber 15. The ionization chamber 11 is maintained at substantially atmospheric pressure. These chambers are configured to form a multi-stage differential pumping system in which the degree of vacuum sequentially increases in a stepwise manner from the ionization chamber 11, through the first intermediate vacuum chamber 12, second intermediate vacuum chamber 13 and first analysis chamber 14 to the second analysis chamber 15.

In FIG. 1, the vacuum pumps for evacuating each chamber are omitted. Typically, the first intermediate vacuum chamber 12 next to the ionization chamber 11 is evacuated by a rotary pump, while the subsequent chambers are each evacuated by a turbomolecular pump combined with a rotary pump employed as a roughing vacuum pump.

The ionization chamber 11 is provided with an electrospray ionization source (ESI source) 111. The ionization chamber 11 communicates with the first intermediate vacuum chamber 12 through a thin desolvation tube 112. The first intermediate vacuum chamber 12 contains a multi-pole ion guide 121. The first intermediate vacuum chamber 12 is separated from the second intermediate vacuum chamber 13 by a skimmer 122 having an opening at its apex. The second intermediate vacuum chamber 13 also contains a multi-pole ion guide 131. The first analysis chamber 14 contains a quadrupole mass filter 141, a collision cell 142 having a multi-pole ion guide 143 inside, as well as the first part of a transfer electrode 144. The second analysis chamber 15 contains the second part of the transfer electrode 144, an orthogonal accelerator 151 including a push-out electrode 1511 and a pulling electrode 1512, a second acceleration electrode unit 152, a flight tube 153, a reflectron 154, a back plate 155 and an ion detector 156.

The voltage source 2 applies a predetermined voltage to each of the electrodes in the related sections of the measurement unit 1 according to the control of the control-and-processing unit 3. For example, those electrodes are specifically included in the ESI source 111, ion guides 121, 131 and 143, quadrupole mass filter 141, transfer electrode 144, orthogonal accelerator 151, second acceleration electrode unit 152, flight tube 153, reflectron 154, back plate 155 and ion detector 156.

The control-and-processing unit 3 is a unit for controlling the measurement unit 1 directly or through the voltage source 2, as well as receiving detection signals obtained in the measurement unit 1 and processing those signals. As shown in FIG. 2, the control-and-processing unit 3 includes, as its functional blocks, a measurement controller 31, data processor 32, tuning executer 33, and parameter storage section 34. The tuning executer 33 includes a parameter searcher 331 and a parameter re-tuner 332 as its sub-functional blocks, with the latter further including a re-tuning controller 3321, approximate function calculator 3322 and parameter determiner 3323.

In normal cases, the control-and-processing unit 3 is actually a personal computer (PC), on which the functions in the previously described functional blocks can be implemented by executing, on the PC, dedicated control-and-processing software installed on the same PC. In that case, the input unit 4 includes a keyboard and a pointing device (e.g., mouse) provided for the PC. The display unit 5 is a monitor display provided for the PC.

An example of an MS/MS analysis operation carried out in the Q-TOFMS according to the present embodiment is hereinafter briefly described. In the present operation, the measurement controller 31 controls the voltage source 2 based on various parameter values held in the parameter storage section 34. The voltage source 2 gives a predetermined voltage to each related section of the measurement unit 1.

The ESI source 111 is continuously supplied with a liquid sample which contains, for example, compounds separated from each other by a liquid chromatograph (not shown). The ESI source 111 ionizes the compounds in the liquid sample by spraying the supplied liquid sample into the ionization chamber 11 while imparting electric charges to the liquid. It should be noted that the ionization technique is not limited to the ESI method; an ion source employing a different type of technique, such as an atmospheric pressure chemical ionization or atmospheric photoionization, may also be used. An ion source for ionizing a gas sample or solid sample, as opposed to a liquid sample, may also be used.

Ions originating from sample components generated in the ionization chamber 11, as well as fine charged droplets from which the solvent has not been sufficiently vaporized, are drawn into the desolvation tube 112 mainly by a gas stream produced by a difference between the pressure within the ionization chamber 11 (substantially atmospheric pressure) and the pressure within the first intermediate vacuum chamber 12. The desolvation tube 112 is heated to an appropriate temperature. Passing the charged droplets through this desolvation tube 112 promotes the vaporization of the solvent in those droplets, whereby the generation of ions originating from the sample components are further promoted.

The ions ejected from the exit end of the desolvation tube 112 into the first intermediate vacuum chamber 12 are converged into the vicinity of the ion beam axis C1 due to the effect of the radiofrequency electric field created by the ion guide 121. The converged ions enter the second intermediate vacuum chamber 13 through the opening at the apex of the skimmer 122. The ions which have entered the second intermediate vacuum chamber 13 are forwarded to the first analysis chamber 14 while being converged by the radiofrequency electric field created by the ion guide 131.

The ions which have entered the first analysis chamber 14 are introduced into the quadrupole mass filter 141, where only an ion having a specific m/z value corresponding to the voltage applied to the quadrupole mass filter 141 is allowed to pass through this mass filter 141. A collision gas, such as argon or nitrogen, is continuously or intermittently supplied into the collision cell 142. An ion (precursor ion) which has passed through the quadrupole mass filter 141 and entered this collision cell 142, having a predetermined amount of energy, comes in contact with the collision gas and undergoes collision-induced dissociation, whereby the ion is divided into fragments, generating various product ions.

The various product ions released from the collision cell 142 are converged by the transfer electrodes 144 consisting of a plurality of ring-shaped electrodes and are sent into the second analysis chamber 15. The ions introduced into the second analysis chamber 15 by the transfer electrode 144 form a thin, highly collimated ion stream and enter the orthogonal accelerator 151, in which the ions are ejected in the substantially orthogonal direction to the incident direction of the ion stream (which is parallel to the ion beam axis C1) in a pulsed form, i.e., as an ion packet which roughly forms a single mass.

The ions forming this ion packet are further accelerated in the second acceleration electrode unit 152 and introduced into the flight space within the flight tube 153. Within this flight space, an electric field for causing ions to follow a folded flight path as indicated by line C2 in FIG. 1 is created by the flight tube 153, reflectron 154 and back plate 155. After being repelled by this electric field, the ions once more fly within the flight tube 153 and ultimately arrive at the ion detector 156. The ion detector 156 includes, for example, a microchannel plate and produces a detection signal corresponding to the number of incident ions. This signal is sent to the control-and-processing unit 3.

In an ideal case, the kinetic energy is equally imparted to all ions in the orthogonal accelerator 151 and the second acceleration electrode unit 152. Therefore, each ion flies at a speed corresponding to its m/z value. More specifically, an ion having a smaller m/z value has a higher speed and arrives at the ion detector 156 earlier. Accordingly, the various ions included in the ion packet and almost simultaneously introduced into the flight space are spatially separated from each other during their flight according to their respective m/z values and have time differences in hitting the ion detector 156.

The orthogonal accelerator 151 and the second acceleration electrode unit 152 correspond to the ion acceleration section in the present invention. The flight tube 153, reflectron 154 and back plate 155 correspond to the flight-field creation section in the present invention. Accordingly, the electrodes included in the ion acceleration section are the push-out electrode 1511, pulling electrode 1512 and a plurality of ring electrodes forming the second acceleration electrode unit 152. The electrodes included in the flight-field creation section are the flight tube 153, a plurality of ring electrodes forming the reflectron 154, and the back plate 155. The transfer electrode 144 corresponds to the ion introduction section in the present invention. The electrodes included in the ion introduction section are a plurality of ring electrodes forming the transfer electrode 144.

The data processor 32 in the control-and-processing unit 3 receives the detection signal from the ion detector 156, converts the same signal into digital data and saves the same data. The data processor 32 also converts, into an m/z value, the time of flight of each ion measured from the point in time of the ejection of the ion packet from the orthogonal accelerator 151 and creates a mass spectrum (product ion spectrum) showing the relationship between m/z value and ion intensity. The created mass spectrum is displayed on the display unit 5 according to a user's instruction given from the input unit 4.

The description thus far has been concerned with an operation in an MS/MS analysis. A mass spectrum can also be acquired by performing a normal mass spectrometric analysis in place of the MS/MS analysis by omitting the selection of an ion with the quadrupole mass filter 141 and allowing all ions to pass through as well as omitting the dissociation of ions within the collision cell 142. Even in that case, a mass spectrum with a high level of mass-resolving power and mass accuracy can be obtained since the mass separation of the ions is performed in the orthogonal acceleration TOFMS.

In order to achieve high levels of sensitivity, mass-resolving power and mass accuracy in the Q-TOFMS according to the present embodiment, it is necessary to appropriately tune the voltages applied to the electrodes in the related sections included in the measurement unit 1. The present Q-TOFMS has an auto-tuning function for automatically and appropriately tuning those voltages. An operation in the auto-tuning process characteristic of the Q-TOFMS according to the present embodiment is hereinafter described.

For orthogonal acceleration TOFMSs, a tuning method has been conventionally known in which the voltages applied to the related electrodes are sequentially tuned so as to maximize, for example, the sensitivity in a measurement of a standard sample, or more specifically, so as to maximize the top intensity of a mass peak corresponding to a specific compound. Another tuning method has also been known in which the voltages applied to the related electrodes are sequentially tuned so as to maximize the mass-resolving power of the mass peak. In particular, mass-resolving power is one of the important performance values in mass spectrometers. Only such devices that can exhibit a higher level of mass-resolving power than a specified target value in an appropriately tuned condition are shipped from the manufacturers of the device. However, as noted earlier, there is an inevitable difference among individual devices even when those devices are of the same model; the highest value of the mass-resolving power that the device can achieve varies from device to device. Therefore, if the tuning of each individual device is performed so as to achieve its highest or nearly highest mass-resolving power, the mass-resolving power that can be achieved by the device will vary from device to device.

In many cases, the difference in mass-resolving power among individual devices causes no problem for a user who owns only a single device. On the other hand, for a user who owns a plurality of devices of the same model, the difference in mass-resolving power among individual devices may possibly cause problems since it is often the case that the user compares mass spectra or other measurement results obtained with a plurality of devices. To address this problem, the Q-TOFMS according to the present embodiment carries out a characteristic tuning operation for maximally equalizing the mass-resolving power among a plurality of devices.

Figure 3:
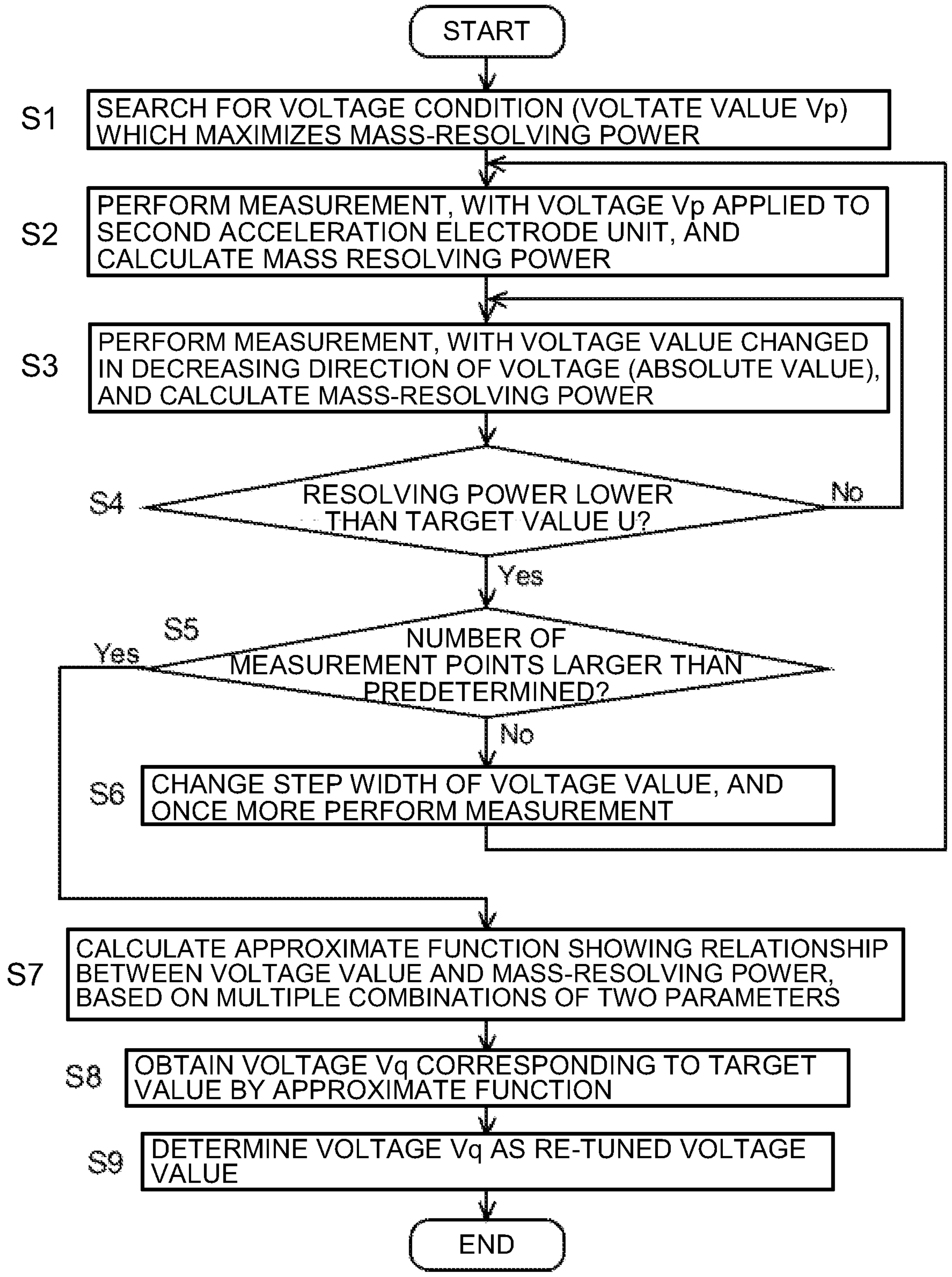
FIG. 3 is a flowchart showing the flow of the auto-tuning operation in the quadrupole time-of-flight mass spectrometer according to the present embodiment.
Figure 4:
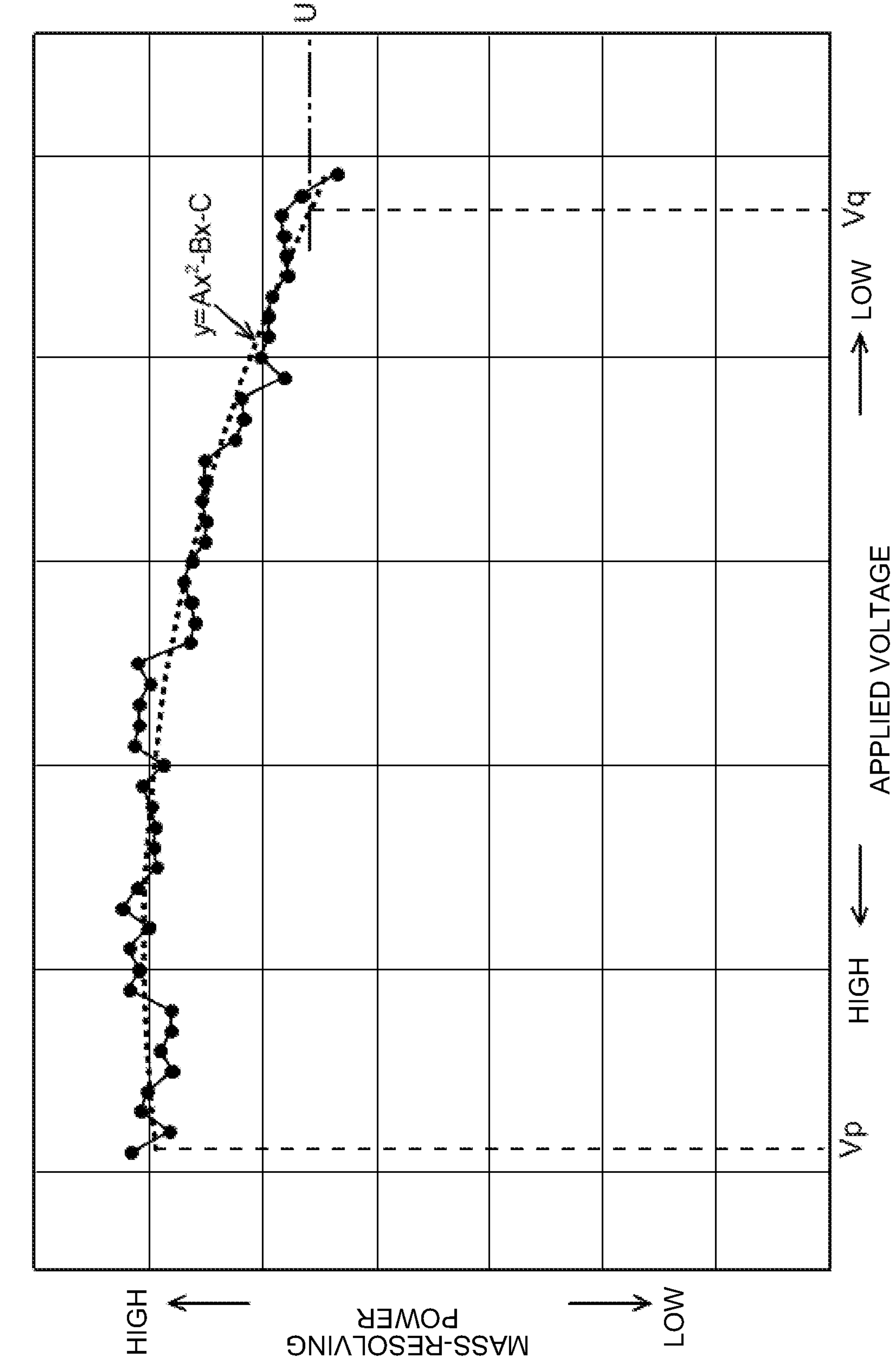
FIG. 4 is a chart showing one example of the relationship between the applied voltage and the mass-resolving power in the quadrupole time-of-flight mass spectrometer according to the present embodiment.

FIG. 3 is a flowchart showing the flow of the auto-tuning operation in the Q-TOFMS according to the present embodiment. FIG. 4 is a chart showing one example of the relationship between the applied voltage and the mass-resolving power in the Q-TOFMS according to the present embodiment.

For example, when a user has performed a predetermined operation with the input unit 4, the tuning executer 33 in the control-and-processing unit 3 performs the auto-tuning according to a predetermined program. When the auto-tuning has been initiated, the parameter searcher 331 repeatedly performs a measurement for the same standard sample while sequentially changing each of the voltages applied to the electrodes in the related sections, to search for a voltage value at which the mass-resolving power is maximized or nearly maximized based on the measurement results (Step S1).

The standard sample contains one or more known compounds at known concentrations. For example, the standard sample can be introduced into the ESI source 111 in place of a normal liquid sample. Alternatively, a dedicated ionization probe for the electrospray ionization of the standard sample may be provided separately from the ESI source 111. The measurement for the standard sample is a normal mass spectrometric analysis which includes no dissociation of ions.

The mass-resolving power can be calculated from the peak of a target compound observed in a mass spectrum obtained as a measurement result. Typically, mass-resolving power R can be calculated by $R=M/\Delta m$, where M is the m/z value of the peak and $\Delta m$ is the full width at half maximum (FWHM) at an intensity of 50% of the peak-top intensity. It should be noted that the method for calculating the mass-resolving power is not limited to this example.

The mass-resolving power and the mass accuracy, each of which is one of the performance values in the Q-TOFMS according to the present embodiment, are dependent on the voltages applied to a plurality of electrodes in the transfer electrode 144 and subsequent sections. For example, a change in the voltages applied to the ring electrodes forming the transfer electrode 144 causes a change in the spread of the ions incident from the transfer electrode 144 into the orthogonal accelerator 151. An increase in the spread of the ions decreases the mass-resolving power since it causes a larger variation of the initial position of the ions in the direction of the path C2 of the ions at the point in time where the pulse voltage is applied to the push-out electrode 1511. There are also other voltages whose change causes a change in the behavior of the ions and thereby changes the mass-resolving power. Examples of such voltages are the pulse voltage applied to the push-out electrode 1511, the direct voltage applied to the pulling electrode 1512, the direct voltages each of which is applied to each of the ring electrodes included in the second acceleration electrode unit 152, the direct voltage applied to the flight tube 153, the direct voltages each of which is applied to each of the ring electrodes included in the reflectron 154, and the direct voltage applied to the back plate 155. Accordingly, in Step S1, voltages applied to a plurality of electrodes among those electrodes are sequentially tuned to search for a voltage condition which maximizes the mass-resolving power.

It should be noted that the search in Step S1 may also be conducted so as to find a voltage condition which provides a high performance from a general viewpoint in which not only the mass-resolving power but also other factors (e.g., sensitivity and mass-peak waveform shape) related to the performance of a mass spectrometer are considered in combination with the mass-resolving power. For example, in the Japanese Patent Application No. 2022-074176, which is a prior application by the applicant, a score value is calculated from the top intensity and the mass-resolving power of a peak, based on a predetermined calculation formula, and a voltage condition which maximizes this score value is searched for. This search is performed since the voltage condition which maximizes the sensitivity in an orthogonal acceleration TOFMS does not always agree with the voltage condition which maximizes the mass-resolving power. By the proposed method, a voltage condition can be found which strikes a balance between sensitivity and mass-resolving power, and yet nearly maximizes the mass-resolving power. Therefore, this method may also be used in the present embodiment to search for a voltage condition which nearly maximizes the mass-resolving power.

An index value which shows the quality of the waveform shape of a mass peak as disclosed in Patent Literature 2 may additionally be used. More specifically, a score value may be calculated from the index value and the mass-resolving power, based on a predetermined calculation formula, and a voltage condition which maximizes this score value may be searched for. By this method, it is possible to find a voltage condition under which the waveform shape of the mass peak is satisfactory to a certain extent while the mass-resolving power is nearly maximized.

In the case of the conventional auto-tuning, the values of the voltages applied to the electrodes determined by the processing in Step S1 are stored as optimum parameter values, and those parameter values are used for the measurement of a target sample. By comparison, in the Q-TOFMS according to the present embodiment, these parameters are re-tuned by performing the processing of Step S2 and the subsequent steps.

The mass-resolving power that can be achieved by the search for the voltage condition in Step S1 may considerably vary from device to device even when the devices are of the same model. As a matter of course, when the devices are in good condition, any of those devices normally has a level of mass-resolving power equal to or higher than the target level U after the completion of the processing in Step S1. However, since the mass-resolving power and other performance values also depend on the mechanical accuracy of the assembly as well as other factors, a difference in performance among the devices inevitably occurs, and the thereby obtained values often considerably vary. In the processing of Step S2 and subsequent steps, the voltage values are re-tuned so as to equalize the mass-resolving power into the vicinity of a previously specified target value U. As an example, the following description deals with the case of re-tuning a voltage applied to the second acceleration electrode unit 152 which significantly affects the mass-resolving power. It should be noted that the target of the re-tuning is not limited to the second acceleration electrode unit 152; any electrode which affects the mass-resolving power can be selected as the target.

The target value U of the mass-resolving power can be previously determined and stored in the parameter storage section 34 by the manufacturer of the device, for example. In that case, since the manufacturer can determine an appropriate target value for each model, the target value can be common to all devices of the same model and independent of users. Therefore, it is possible to roughly equalize the mass-resolving power among all devices of the same model regardless of who is the owner of each individual device. However, it should be noted that devices which are identical in hardware configuration may have different levels of mass-resolving power depending on the version of the control-and-processing software used in each device. In that case, the devices may be configured so as to update the target value of the mass-resolving power with the updating of the software. Each device may be configured to allow users to change the target value of the mass-resolving power so that a user who owns a plurality of devices of the same model can equalize the mass-resolving power only among those devices. In that case, the target value U is a target value which is only common to the plurality of devices owned by that user.

At the time of the shipment of the device from the factory, the manufacturer may tune the mass-resolving power at a lower value than the value guaranteed in the catalog specifications, allowing for a certain amount of measurement error. This lower value may be adopted as the target value U, or the value guaranteed in the catalog specifications may be adopted as it is. The target value U can be set at various other values provided that the value can be achieved in each of the devices concerned and are also common to all of those devices.

The re-tuning controller 3321 in the parameter re-tuner 332 sets the voltages applied to the electrodes in the related sections, including the second acceleration electrode unit 152, at the respective voltage values (initial voltage values) determined by the processing in Step S1, and subsequently controls each section so as to perform a measurement for a standard sample. Let Vp denote the initial voltage value applied to the second acceleration electrode unit 152 in this measurement. Based on the data obtained by the measurement, the re-tuning controller 3321 calculates the mass-resolving power from the peak in the previously described manner (Step S2).

Next, the re-tuning controller 3321 changes the voltage value from the current voltage by a predetermined step width in the direction for decreasing the voltage value (i.e., for decreasing the absolute value of the voltage), and controls each section so as to perform a measurement for the standard sample under the new voltage value. The re-tuning controller 3321 calculates the mass-resolving power from the peak based on the data obtained by this measurement (Step S3).

In Step S3, the voltage value may be changed in the increasing direction from the initial voltage value Vp (in the direction for increasing the absolute value of the voltage), as opposed to the direction for decreasing the voltage value from the initial voltage value Vp. However, an experiment by the present inventors has demonstrated that changing the voltage value of the second acceleration electrode unit 152 in the increasing direction from the initial voltage value (i.e., the voltage value which maximizes the mass-resolving power) causes not only a decrease in mass-resolving power but also a deterioration in the waveform shape of the mass peak (the tailing or leading edge becomes longer). Therefore, in the present example, the voltage change in the direction for decreasing the voltage value is adopted so that the deterioration of the waveform shape of the mass peak will not occur (or barely occur). If such a deterioration of the waveform shape of the mass peak or similar phenomenon does not occur, the voltage can be changed in the direction for increasing the voltage value from the initial voltage value.

After Step S3 has been performed, the re-tuning controller 3321 determines whether or not the calculated mass-resolving power is lower than the target value U of the mass-resolving power (Step S4). If the calculated value is not lower than the target value U, the operation returns from Step S4 to Step S3. Accordingly, through the repeat of Steps S3 and S4, the measurement for the standard sample is repeatedly performed, with the voltage applied to the second acceleration electrode unit 152 gradually changed in predetermined step widths, until the mass-resolving power becomes lower than the target value U. When the mass-resolving power has been lower than the target value U, the operation proceeds from Step S4 to Step S5 to determine whether or not the number of measurement points processed until then is equal to or larger than a predetermined number. This predetermined number may be any appropriate number equal to or greater than three, such as three or five. The aim of the determination in Step S5 is to avoid a situation in which the accuracy of the approximate function (which will be described later) cannot be satisfactorily ensured.

When the number of measurement points determined in Step S5 is smaller than the predetermined number, the step width for changing the voltage value is decreased (Step S6), and the operation returns to Step S2 to once more perform the re-tuning from the beginning.

When the number of measurement points determined in Step S5 is equal to or larger than the predetermined number, the approximate function calculator 3322 performs a regression analysis based on the plurality of combinations of the voltage value and mass-resolving power obtained through the processing of Steps S2 and S4, to calculate an approximate function showing the relationship between voltage value and mass-resolving power (Step S7). For the regression analysis, a least squares method can be used, which involves comparatively simple operations and yet can yield a satisfactory result. As for the approximate function, a cubic or higher-order function may also be used, although a quadratic function is sufficient in normal cases.

FIG. 4 is an actually measured example, in which the voltage was changed by a narrow step width so that the number of measurement points was considerably large. The mass-resolving power fluctuates with every change in the applied voltage. However, a sufficiently reliable approximate function $y=Ax^2-Bx-C$ as represented by the broken line in the figure can be obtained from the plurality of combinations of the voltage value and the mass-resolving-power.

Next, the parameter determiner 3323 determines the voltage Vq corresponding to the target value U of the mass-resolving power, as shown in FIG. 4, using the approximate function calculated in Step S7 (Step S8). Then, the parameter determiner 3323 determines this voltage Vq as the re-tuned voltage value to be applied to the second acceleration electrode unit 152 (Step S9). This determined voltage value is stored in the parameter storage section 34 and will be used in the subsequent measurements.

Thus, in the Q-TOFMS according to the present embodiment, after the voltage condition has been set so as to maximize or nearly maximize the mass-resolving power, the applied voltage in each device can be re-tuned so as to bring the mass-resolving power into the vicinity of the target value U which is common to a plurality of devices.

Performing the tuning in this manner produces the following advantageous effects.

(1) The mass-resolving power of a plurality of devices can be uniformized within the vicinity of the target value U. This reduces the variation of the measurement results obtained by a measurement of the same sample using the plurality of devices.

(2) Even in the case where a measurement is performed multiple times with a single device under a specific voltage condition, the measurement result varies to a certain extent. Therefore, in order to calculate an average of the variation, the measurement needs to be performed multiple times under the same voltage condition. This leads to a longer period of time required for the tuning as well as an increase in operation cost due to the increase in the use of the standard sample. By comparison, by the previously described technique, the influence of the variation of the measurement results which will occur when a measurement is performed multiple times under the same voltage condition can be reduced without actually performing the measurement multiple times, and a voltage value which is highly exact (i.e., which easily allows the mass-resolving power to be close to the target value U) can be obtained. Consequently, the period of time required for the tuning is reduced. The use of the standard sample can also be reduced, whereby the operation cost is decreased.

As noted earlier, the number of measurement points in the example shown in FIG. 4 is considerably large. If a quadratic function is used as the approximate function, a considerably exact approximation which is sufficient for practical purposes is possible even when the number of measurement points is as small as three, four or five.

As noted earlier, the tuning of the mass-resolving power in the previous description is achieved by changing the voltage applied to the second acceleration electrode unit 152. The tuning of the mass-resolving power can also be achieved by changing a voltage applied to an electrode included in the transfer electrode 144, orthogonal accelerator 151, flight tube 153, reflectron 154 or back plate 155.

In the Q-TOFMS according to the previously described embodiment, the mass-resolving power will ultimately fall within the vicinity of the target value U as a result of the auto-tuning. There may be users who want to perform the tuning so as to obtain the highest possible mass-resolving power for the device. Needless to say, such a tuning can be manually performed, but the tuning task is considerably cumbersome. To deal with this situation, the Q-TOFMS according to the present embodiment may be configured to allow the user to select, for the auto-tuning process, whether the tuning should be discontinued immediately after the completion of Step S1 in the flowchart shown in FIG. 2, or the processing of Steps S2 through S9 which follow Step S1 should be performed before the completion of the tuning. By this selection, the user can conduct, as needed, a measurement with the highest possible mass-resolving power for the device, or with mass-resolving power close to that level.

Although the previously described embodiment is an example in which the present invention is applied in a reflectron type of orthogonal TOFMS, the present invention is not limited to the reflectron type; it may also be applied in other types of TOFMS having a different form of flight path, such as a linear or multiturn TOFMS. In a linear TOFMS, the flight tube is the only electrode included in the flight-field creation section. In a multiturn TOFMS, the electrodes in the flight-field creation section include electrodes for causing ions to fly in a loop path (or to fly in a helical path or the like) as well as an electrode for introducing ions into the aforementioned path and/or causing ions to leave the aforementioned path.

The present invention is not limited to the orthogonal acceleration system; for example, it can also be applied to an ion trap TOFMS in which measurement-target ions are temporarily held in a linear ion trap or three-dimensional quadrupole ion trap, and an acceleration voltage is applied to the electrodes forming the ion trap to eject the ions from the ion trap into the flight space. In that case, the electrodes included in the ion acceleration section are the electrodes forming the ion trap.

The present invention can also be applied in a type of TOFMS in which ions generated from a sample in the ion source are immediately extracted from the vicinity of the sample and accelerated into the flight space, as in a MALDI-TOFMS which employs a matrix-assisted laser desorption/ionization source as the ion source. In that case, the electrodes included in the ion acceleration section are an extracting electrode for extracting ions from the vicinity of the sample and an acceleration electrode for accelerating the extracted ions.

Furthermore, the previously described embodiment as well as the various modified examples described thus far are mere examples of the present invention. It is evident that any modification, change or addition appropriately made within the spirit of the present invention will fall within the scope of claims of the present application.

Various Modes

It is evident for a person skilled in the art that the previously described illustrative embodiment is a specific example of the following modes of the present invention.

(Clause 1) One mode of the TOFMS according to the present invention is a time-of-flight mass spectrometer having a measurement unit which includes a flight-field creation section configured to create, within a flight space, an electric field for causing ions to fly, and an ion acceleration section configured to accelerate ions which are a measurement target and to send the ions into the flight space, the time-of-flight mass spectrometer including:

a controller unit configured to operate the measurement unit so as to repeatedly perform a measurement for a predetermined sample while varying a voltage applied to an electrode included in the measurement unit, and to calculate mass-resolving power based on a measurement result in each measurement;

an approximate function calculator unit configured to find an approximate function which approximates a relationship between the voltage applied to the electrode and the mass-resolving power corresponding to the voltage, based on data of a plurality of combinations of the voltage and the mass-resolving power obtained under the control of the controller unit; and a voltage determiner unit configured to determine a voltage value corresponding to a target value of the mass-resolving power by using the approximate function, and to determine the voltage value as a voltage to be applied to the electrode in the time-of-flight mass spectrometer concerned.

(Clause 2) In the TOFMS according to Clause 1, the target value may be a common value specified for a plurality of devices whose mass-resolving power is to be equalized.

(Clause 11) One mode of the tuning method for a TOFMS according to the present invention is a method for tuning a plurality of time-of-flight mass spectrometers each of which has a measurement unit which includes a flight-field creation section configured to create, within a flight space, an electric field for causing ions to fly, and an ion acceleration section configured to accelerate ions which are a measurement target and to send the ions into the flight space, the tuning method including:

a target setting step for setting a target value of the mass-resolving power common to the plurality of time-of-flight mass spectrometers; and a measurement step and a voltage determination step which are performed in each of the plurality of time-of-flight mass spectrometers, where:

the measurement step includes repeatedly performing a measurement for a predetermined sample while varying a voltage applied to an electrode included in the measurement unit, and calculating the mass-resolving power based on a measurement result in each measurement; and the voltage determination step includes determining a voltage value corresponding to the target value based on data of a plurality of combinations of the voltage applied to the electrode and the mass-resolving power corresponding to the voltage, obtained in the measurement step, and determining the voltage value as the voltage to be applied to the electrode in the time-of-flight mass spectrometer concerned.

The "plurality of devices whose mass-resolving power is to be equalized" or the "plurality of time-of-flight mass spectrometers" are generally a plurality of devices of the same model which are identical in configuration and structure, although they may also be a plurality of devices which are different in partial configuration or structure, or in the software system for controlling the device, as long as those devices can achieve the same level of mass-resolving power.

By the TOFMSs according to Clauses 1 and 2 as well as the tuning method for TOFMS according to Clause 11, the mass-resolving power can be roughly equalized among a plurality of devices of the same model, so that the difference in mass-resolving power among the devices can be decreased. Therefore, the variation of the measurement results obtained by performing a measurement of the same sample with a plurality of devices can be reduced.

Even a measurement performed for the same sample under the same voltage condition will show a certain variation in the measurement result when the measurement is performed multiple times. In order to obtain a more correct measurement result under one specific voltage condition, it is necessary to perform an appropriate task, such as the averaging of the results obtained by performing the measurement a larger number of times under the same voltage condition. However, such a task requires a longer period of time for the measurement, and the period of time for the tuning also becomes accordingly longer. By comparison, in the TOFMS according to Clauses 1 and 2 as well as the tuning method for TOFMS according to Clause 11, the influence of the variation in the measurement result under one specific voltage condition can be reduced by determining an approximate function based on measurement results obtained by performing the measurement with a voltage gradually changed. This allows the number of times of the measurement under the same voltage condition to be decreased. Therefore, it is possible to equalize the mass-resolving power at or in the vicinity of the target value while reducing the period of time required for the tuning.

(Clause 3) In the TOFMS according to Clause 1, the approximate function calculator unit may be configured to calculate the approximate function by a least squares method.

For the calculation of the approximate function based on the data of a plurality of combinations of the voltage applied to the electrode and the mass-resolving power corresponding to that voltage, a technique of regression analysis can be used. Specifically, by using a least squares method, a highly reliable approximate function can be determined in a comparatively convenient way. Accordingly, the TOFMS according to Clause 3 increases the possibility that a level of mass-resolving power which is even closer to the target value can be achieved by performing the tuning.

(Clause 4) In the TOFMS according to Clause 3, the function may be a quadratic function.

According to a study by the present inventors, the relationship between the voltage applied to an electrode and the mass-resolving power can be satisfactorily approximated by a comparatively simple curve. Accordingly, by the TOFMS according to Clause 4, a highly reliable approximate curve can be conveniently obtained.

(Clause 5) In the TOFMS according to one of Clauses 1-4, the controller unit may be configured to operate the measurement unit so as to repeatedly perform a measurement operation at least until the mass-resolving power becomes lower than the target value, where the measurement operation includes performing a measurement for a predetermined sample, with a voltage applied to an electrode included in the measurement unit gradually changed from an initial voltage value at which a higher level of mass-resolving power than the target value is obtained, and calculating the mass-resolving power based on the result of the measurement.

By the TOFMS according to Clause 5, a voltage which yields a higher level of mass-resolving power than the target value and a voltage which yields a lower level of mass-resolving power than the target value can be more assuredly found with a smaller number of times of the measurement. Therefore, the number of unsuccessful tuning operations can be reduced, and the period of time required for the tuning can be decreased.

(Clause 6) In the TOFMS according to Clause 5, the initial voltage value may be a voltage value which maximizes the mass-resolving power, or which maximizes the mass-resolving power under the condition that at least the sensitivity or an index value representing the quality of the waveform shape of a mass peak is within a permissible range.

One example of the index value representing the quality of the waveform shape is the ratio of two peak widths at two intensities of a mass peak, which is disclosed in Patent Literature 2. Another example is an asymmetry factor which is an index representing the degree of symmetry (or asymmetry) of a peak.

In the TOFMS according to Clause 6, a measurement is repeated, with the voltage gradually changed from a voltage condition which maximizes the mass-resolving power, or from a voltage condition which does not always maximize the mass-resolving power yet yields the highest possible level of mass-resolving power under the condition that the level of sensitivity or the quality of the mass-peak waveform shape is within a satisfactory range.

(Clause 7) The TOFMS according to Clause 6 may further include a best condition searcher configured to perform a tuning operation in which voltages applied to a plurality of electrodes included in the measurement unit are sequentially tuned so as to maximize the mass-resolving power or so as to maximize the mass-resolving power under the condition that at least the sensitivity or the index value representing the quality of the waveform shape is within the permissible range, where a voltage or voltages applied to one or more predetermined electrodes are tuned by the controller unit, the approximate function calculator unit and the voltage determiner unit after the tuning operation by the best condition searcher is completed.

In the TOFMS according to Clause 7, since the voltage condition is initially set so that the mass-resolving power is maximized or nearly maximized, the situation in which the mass-resolving power cannot reach the target value due to an inappropriate setting of the voltage condition can be avoided.

(Clause 8) In the TOFMS according to one of Clauses 1-7, the measurement unit may include an ion introduction section configured to introduce ions into the ion acceleration section, and the controller unit may be configured to collect data which are combinations of the voltage and the mass-resolving power, by repeating the measurement while gradually changing a voltage applied to an electrode included in the ion introduction section, the ion acceleration section or the flight-field creation section.

(Clause 9) In the TOFMS according to Clause 8, the ion acceleration section may be configured to accelerate ions introduced from the ion introduction section, in a direction orthogonal to the direction in which the ions are introduced.

The TOFMS according to Clause 9 can almost continuously perform a measurement of ions originating from a sample which is supplied, for example, from a liquid chromatograph, gas chromatograph or similar source, without retaining the ions within an ion trap or similar device.

(Clause 10) In the TOFMS according to Clause 9, the ion acceleration section may include a first acceleration electrode to which a pulse voltage for accelerating ions is to be applied and a second acceleration electrode to which a voltage for further accelerating the ions already accelerated by the first acceleration electrode is to be applied, and the controller unit may be configured to tune the voltage applied to the first acceleration electrode or the second acceleration electrode when tuning the mass-resolving power.

The TOFMS according to Clause 10 can appropriately tune the mass-resolving power while suppressing unfavorable effects on the sensitivity or other performance values.

REFERENCE SIGNS LIST

1 . . . Measurement Unit
10 . . . Vacuum Chamber
11 . . . Ionization Chamber
111 . . . ESI Source
112 . . . Desolvation Tube
12 . . . First Intermediate Vacuum Chamber
121 . . . Ion Guide
122 . . . Skimmer
13 . . . Second Intermediate Vacuum Chamber
131 . . . Ion Guide
14 . . . First Analysis Chamber
141 . . . Quadrupole Mass Filter
142 . . . Collision Cell
143 . . . Ion Guide
144 . . . Transfer Electrode
15 . . . Second Analysis Chamber
151 . . . Orthogonal Accelerator
1511 . . . Push-Out Electrode
1512 . . . Pulling Electrode
152 . . . Second Acceleration Electrode Unit
153 . . . Flight Tube
154 . . . Reflectron
155 . . . Back Plate
156 . . . Ion Detector
2 . . . Voltage Source
3 . . . Control-and-Processing Unit
31 . . . Measurement Controller
32 . . . Data Processor
33 . . . Auto-Tuning Executer
331 . . . Optimum Parameter Searcher
332 . . . Parameter Re-Tuner
3321 . . . Re-Tuning Controller
3322 . . . Approximate Function Calculator
3323 . . . Parameter Determiner
34 . . . Parameter Storage Section
4 . . . Input Unit
5 . . . Display Unit

The invention claimed is:

1. A time-of-flight mass spectrometer having a measurement unit which includes a flight-field creation section configured to create, within a flight space, an electric field for causing ions to fly, and an ion acceleration section configured to accelerate ions which are a measurement target and to send the ions into the flight space, the time-of-flight mass spectrometer comprising:

a controller unit configured to operate the measurement unit so as to repeatedly perform a measurement for a predetermined sample while varying a voltage applied to an electrode included in the measurement unit, and to calculate mass-resolving power based on a measurement result in each measurement;

an approximate function calculator unit configured to find an approximate function which approximates a relationship between the voltage applied to the electrode and the mass-resolving power corresponding to the voltage, based on data of a plurality of combinations of the voltage and the mass-resolving power obtained under a control of the controller unit; and a voltage determiner unit configured to determine a voltage value corresponding to a target value of the mass-resolving power by using the approximate function, and to determine the voltage value as a voltage to be applied to the electrode in the time-of-flight mass spectrometer.

2. The time-of-flight mass spectrometer according to claim 1, wherein the target value is a common value specified for a plurality of devices whose mass-resolving power is to be equalized.

3. The time-of-flight mass spectrometer according to claim 1, wherein the approximate function calculator unit is configured to calculate the approximate function by a least squares method.

4. The time-of-flight mass spectrometer according to claim 3, wherein the approximate function is a quadratic function.

5. The time-of-flight mass spectrometer according to claim 1, wherein the controller unit is configured to operate the measurement unit so as to repeatedly perform the measurement until the mass-resolving power becomes lower than the target value with a voltage applied to an electrode included in the measurement unit gradually changed from an initial voltage value at which a higher level of mass-resolving power than the target value is obtained.

6. The time-of-flight mass spectrometer according to claim 5, wherein the initial voltage value is a voltage value which maximizes the mass-resolving power, or which maximizes the mass-resolving power under a condition that at least a sensitivity or an index value representing a quality of a waveform shape of a mass peak is within a permissible range.

7. The time-of-flight mass spectrometer according to claim 6, further comprising a best condition searcher configured to perform a tuning operation in which voltages applied to a plurality of electrodes included in the measurement unit are sequentially tuned so as to maximize the mass-resolving power or so as to maximize the mass-resolving power under the condition that at least the sensitivity or the index value representing the quality of the waveform shape is within the permissible range, where a voltage or voltages applied to one or more predetermined electrodes are tuned by the controller unit, the approximate function calculator unit, and the voltage determiner unit after the tuning operation by the best condition searcher is completed.

8. The time-of-flight mass spectrometer according to claim 1, wherein the measurement unit includes an ion introduction section configured to introduce ions into the ion acceleration section, and the controller unit is configured to collect data which are combinations of the voltage applied to the electrode and the mass-resolving power, by repeating the measurement while gradually changing a voltage applied to an electrode included in the ion introduction section, the ion acceleration section, or the flight-field creation section.

9. The time-of-flight mass spectrometer according to claim 8, wherein the ion acceleration section is configured to accelerate ions introduced from the ion introduction section in a direction orthogonal to a direction in which the ions are introduced.

10. The time-of-flight mass spectrometer according to claim 9, wherein the ion acceleration section includes a first acceleration electrode to which a pulse voltage for accelerating ions is to be applied and a second acceleration electrode to which a voltage for further accelerating the ions already accelerated by the first acceleration electrode is to be applied, and the controller unit is configured to tune the mass-resolving power by tuning the voltage applied to the first acceleration electrode or the second acceleration electrode.

11. A method for tuning a plurality of time-of-flight mass spectrometers each of which has a measurement unit which includes a flight-field creation section configured to create, within a flight space, an electric field for causing ions to fly, and an ion acceleration section configured to accelerate ions which are a measurement target and to send the ions into the flight space, the tuning method comprising:

a target setting step for setting a target value of the mass-resolving power common to the plurality of time-of-flight mass spectrometers; and a measurement step and a voltage determination step which are performed in each of the plurality of time-of-flight mass spectrometers, wherein:

the measurement step includes repeatedly performing a measurement for a predetermined sample while varying a voltage applied to an electrode included in the measurement unit, and calculating the mass-resolving power based on a measurement result in each measurement; and the voltage determination step includes determining a voltage value corresponding to the target value based on data of a plurality of combinations of the voltage applied to the electrode and the mass-resolving power corresponding to the voltage, obtained in the measurement step, and determining the voltage value as the voltage to be applied to the electrode in the time-of-flight mass spectrometer concerned.

* * * * *